(12) United States Patent
Harneit

(10) Patent No.: US 6,691,735 B1
(45) Date of Patent: Feb. 17, 2004

(54) FINE ADJUSTMENT DEVICE FOR GAS PRESSURE REGULATORS

(76) Inventor: Uwe Harneit, 1466 W. Francis Ave., Ontario, CA (US) 91762-6016

( * ) Notice: Subject to any disclaimer, the term of this patent is extended or adjusted under 35 U.S.C. 154(b) by 0 days.

(21) Appl. No.: 09/413,950

(22) Filed: Oct. 7, 1999

(51) Int. Cl.[7] ............................................... F16K 37/00
(52) U.S. Cl. ..................................... 137/524; 137/505
(58) Field of Search ........................... 137/505, 505.11, 137/524, 315.15; 16/423, 427, 433, 441, DIG. 24, DIG. 40, DIG. 41

(56) References Cited

U.S. PATENT DOCUMENTS

| | | | | |
|---|---|---|---|---|
| 968,597 A | * | 8/1910 | Parkin | 137/524 |
| 1,485,959 A | | 3/1924 | Brown | |
| 1,582,928 A | * | 5/1926 | Hoag | 137/524 |
| 1,800,981 A | * | 4/1931 | Beste | 16/432 |
| 2,076,600 A | | 4/1937 | Smith | |
| 2,184,607 A | * | 12/1939 | Swanson | 16/82 |
| 2,462,287 A | * | 2/1949 | Richeson | 137/524 |
| 2,819,728 A | * | 1/1958 | Gage et al. | 137/505.11 |
| 3,374,803 A | | 3/1968 | Leveque | |
| 3,395,537 A | | 8/1968 | Stelzer | |
| 3,582,116 A | * | 6/1971 | Young | 16/427 |
| 4,545,405 A | * | 10/1985 | LaBelle | 137/524 |
| 4,777,978 A | * | 10/1988 | Hsiao | 137/524 |
| 5,722,454 A | | 3/1998 | Smith et al. | |

* cited by examiner

*Primary Examiner*—John Rivell
(74) *Attorney, Agent, or Firm*—Lewis M. Brande; Thomas A. McCleary; Brande and McCleary (57) ABSTRACT

The current invention describes a pressure regulator for a gas burner that allows a consumer to make adjustments to the pressure regulator for differences in altitude as well as differences in the design and manufacturing tolerances of the pressure regulator from the manufacturer. Many traditional gas burners require a third party, with specialized equipment and training, to make corrective adjustments to the pressure to a gas burner after the burner is sold to the consumer.

This pressure regulator incorporates a regulating curve into the pressure regulator, thus eliminating the need to remove the pressure regulator from the appliance and allowing the consumer himself to make the necessary adjustments to the burner without the assistance of a third party.

5 Claims, 6 Drawing Sheets

FINE ADJUSTMENT DEVICE FOR GAS PRESSURE REGULATORS

BACKGROUND OF THE INVENTION

1. Field of the Invention

In the current state of the art, it is known that many pressure regulators can be set for a specific pressure, e.g. 10" (inch) Water Column (the preferred pressure for liquid propane bottled gas). Also known in the art are pressure regulators, in which a pressure spring bears on a membrane and can be set for a second specific pressure by reversing a sealing cap, which is located above the pressure spring. In the models previously described, a screwed sealing plug is designed in such a way that it makes no difference from which side of the pressure regulator the plug is screwed in or pulled out. The adjustment necessary for the regulator to operate at a second set pressure is achieved by making the sealing plug consist of two cylindrical pads each of differing lengths over a sealing component. These cylindrical pads grip within a recess in the pressure spring, so that the spring has a different length due to the amount of compression from the spring. This, in turn, bears on the membrane with a greater pressure thus creating the desired pressure.

The primary disadvantage with this earlier design is that the sealing screw, which is normally loosened by a tool and then reversed (turned over), must be reinserted in the same hole. When this is done, there is a possibility that dirt or debris can fall into the hole and become stuck under the pressure spring. In addition, if an improperly sized wrench or an incorrect tool, such as pliers, are used to loosen the sealing screw, the second uncovered threading that is used in the adjustment could be easily damaged. In either case, the adjustable pressure regulator described above could is limited since it can only be used for two predetermined pressure settings.

Other pressure regulators have an additional screw located beneath the sealing screw. This additional screw presses on a spring that bears on the membrane. After removal of the pressure spring, the second screw located under the sealing screw can be turned in or out, thus shortening or lengthening the path of the pressure spring. This results in a pressure regulator that can be adjusted very precisely to a given pressure setting.

The disadvantage with this design, however, is that the adjustment to different pressures can only be made by an expert. The expert must have specific measuring devices that can verify the desired pressure when the adjustment is made. This task is very expensive, because the gas flow pressure must be measured. This requires that all the jets through which the gas flows must be fully opened. These jets are installed behind the pressure regulator and can be closed by gas valves, normally.

The current state of the art for pressure regulators normally found on the market incorporate a pressure spring, which bears on a membrane. Various methods are used to set and control predetermined pressures, wherein a spring is pressed against a membrane to achieve a particular pressure. These predetermined pressures cannot be precisely maintained. Cost and assembly requirements yield average tolerances of ±5%. In order to further facilitate the manufacture of pressure regulators in the industry, there are efforts within the market to relax the tolerances from ±5% to ±10%.

Increasing the manufacturing tolerances of pressure regulators from ±5% to ±10% will have a detrimental effect on the final product. Gas regulators with a tolerance of ±10% that have been designed to run at 30 mbar (millibar) pressure could have an actual manufactured pressures that range from 27 mbar to 33 mbar. The effects of varying gas pressures are well known in the art.

An appliance manufacture usually specifies the performance of a gas burner at a setting of 20,000 Btu/h (British thermal unit/hour). This permits the manufacturer to calculate when a steak at this setting will be grilled well done within a specified time. The steak will neither be burned nor left almost raw. A consumer, relying on this representation, would see a big difference in how underdone or well-done his steak was cooked, if a ±10% tolerance range in the gas pressure was allowed, since the burner would operate between 18,000 Btu/h and 22,000 Btu/h in the above example. The steak could be either almost raw or burned, due to variances in the operating pressure from the predetermined design pressure.

An additional shortcoming of current designs in pressure regulators concerns the atmospheric pressure above sea level. Many manufacturers offer gas appliances for either sea level or for high altitudes, since the atmospheric pressure varies with the altitude. At higher altitudes there is less oxygen available to mix with a flammable gas used in a gas burner. To compensate for the reduced amount of oxygen at these altitudes, manufacturers typically use gas jets with different orifice diameters, which is determined by the particular altitude at which the appliance is located.

This means that the manufacturers must both produce and warehouse appliances not only for a variety of flammable gases, i.e. liquified propane, natural gas, etc., but also, they must equip these appliances with different sized gas jet orifices for various altitudes. If these design concessions are not made for the consumer, the grill may not heat up sufficiently to cook their food or conversely the grill will be too hot to cook food without burning it.

The best method of assuring that the Btu/h rates specified by the manufacturer corresponds to the actual rates at the location where the gas-burning appliance is to be used, is to use an adjustable pressure regulator. As previously mentioned, the older adjustable pressure regulators are inconvenient to use, requiring an expert with the correct measuring devices to adjust the regulator.

It is undesirable to force the consumer to expend additional funds on an expensive procedure to adjust the gas pressure, so that he can use his gas appliance. A consumer, after purchasing a new gas grill, reasonably expects that the gas grill can be used immediately. The consumer assumes that the gas grill has been correctly adjusted for the altitude that the grill is located, and the type of flammable gas that is to be used. The consumer is generally ignorant of the effects of different altitudes on grilling times or the effects of spring pressures on a membrane in their gas pressure regulator.

2. Description of the Prior Art

Prior art U.S. Pat. No. 1,485,959 discloses a Pressure Regulating Valve. This invention uses a standard threading to vary the input to the output pressure. Another object of this patent is to create a valve that has a diaphragm that more easily retains it's resiliency, even after extreme distortion. This invention uses the position of a valve within a bore to regulate the pressure. The fluid enters the valve and is directed downwards through the bore where the valve's position regulates the flow to a chamber, then to a passageway which leads to an exit port.

Prior art U.S. Pat. No. 2,076,000 discloses a Flow Controlled Device. The object of this invention is to create a regulation device for liquids that is operable in either direction. Flow control is achieved by the use of a vane and a cam. Pressure from one side of the vane will cause the vane to pivot on it's supports. A cam follower will lift a valve member from it's seat and permit escape of the liquid from a plug aperture. The plug aperture leads to a drain trap. The flow control is entirely maintained by the pivoting of the vane.

Prior art U.S. Pat. No. 3,374,803 discloses a Volume and Flow Control Device. The object of this invention is to create a simple and economical device for controlling the volume and flow of air to a motor. This device operates by means of a moveable piston. A threaded knob applies pressure to the piston through a spring, with an opposing spring maintaining piston position from below by applying an upwards pressure. The intake end has a passage that communicates with a groove between the piston and the bore. The outlet end has a passage that is offset from the cylindrical axis of the outlet, being biased towards the bottom of the outlet bore. The groove only partially uncovers the outlet passage. Since the flow area of the inlet is greater than that of the outlet, the air pressure in the inlet will be greater than the outlet. This achieves the desired result of regulating the flow and volume of the air into the motor. Flow control revision is achieved by operation of the knob.

Prior art U.S. Pat. No. 3,395,537 discloses a Proportioning Valve. The basic object of this invention is to regulate hydraulic pressure to a rear set of brakes on a car or other vehicle. Inlet pressure operates on a piston that has a spring with a known spring force. When the desired pressure is applied to the piston, the piston will move, opening a passage to the rear brakes of the vehicle. In practice, the rim of the piston remains pressed against a seal but still allows liquid to bleed by, which increases the outlet pressure at a lesser rate than the inlet pressure is increased. In this invention, the only method of varying the regulating spring is to disassemble the device and replace the spring.

Prior art U.S. Pat. No. 5,722,454 discloses a Fluid Flow Fuse. The basic purpose of this invention is to provide a means for automatic shutoff of fluid flow when there is a predetermined pressure differential between the inlet and the outlet. A passage leads to a cavity above a diaphragm, which exceeds a force on the diaphragm when the pressure on the inlet and the outlet are different. This force moves a valve member to a valve seat. This force is opposed by biasing means such as springs. In normal conditions when the valve is open, the spring force must be larger than the forces on the diaphragm so as to allow the valve to remain in an open position. Regulation of this device is by an internal spring which is not easily removed.

SUMMARY OF THE INVENTION

The following description is provided to enable a person skilled in the art to make and use the invention and sets forth the best modes contemplated by the inventor for carrying out his invention. Various modifications, however, will be readily apparent to those skilled in the art, since the generic principles of the present invention have been defined herein specifically to provide for an improved adjustable gas pressure regulator.

The object of this invention is to create a pressure regulator that allows the consumer to compensate for differences in altitude as well as differences in the design and manufacture tolerances of the pressure regulator from the manufacturer. This invention will provide the consumer with a simple method of changing the pressure regulator performance (Btu/h) himself, without the need of specialized tools and/or measuring devices.

The challenge posed by this invention was solved by inserting a regulating curve into the pressure regulator. This eliminates the need to remove the pressure regulator from the appliance. A regulating element is operated by this regulating curve. The regulating element has a shaft, with the shaft penetrating through the regulating curve. An indexing pin protrudes sideways from the shaft and bears against the regulating curve. A regulating knob is located on the shaft.

The regulating curve has, on one side, a guide way running at an incline around a central axis. The guide way additionally has concave detents radiating away from the central axis. These concave detents are slightly indented within the guide way. This will allow the indexing pin mounted on the regulating element to rest inside the concave detents, and will prevent a shift of position.

Beneath the indexing pin, the regulating element has a flat plate or collar that positions and presses on the spring of the pressure regulator. The spring is always in compression, so that the indexing pin will be held in place in one of the concave detents formed in the regulating curve. The regulating element, therefore, is constantly pressed against the regulating curve. By turning the regulating element, the indexing pin is stopped and positioned in one of the detents in the regulating curve.

Depending on which direction the regulating element is turned, the spring under the plate of the regulating element has either greater or lesser compression. As the regulating element is turned, the spring installed between the membrane and the plate of the regulating element becomes longer or shorter. This is equivalent to increasing or decreasing the membrane pressure which is opposing the gas flowing into the regulator, and results in a change of gas flow pressure at the regulator outlet.

By using this design, it is possible to compensate for the tolerance in bearing pressure of the spring by lengthening or shortening the spring's extension path. One can also compensate for variations in atmospheric pressure by lengthening or shortening the spring, without having to exchange the jets through which gas flows to the burner. If a consumer determines that his grill does not generate enough heat, he need only turn the hand knob on the regulating element to a different detent position in order to reach the heat generation level that he desires. A particular preset position can be indicated by a scale set on the hand knob.

Most pressure regulators currently on the market could be refit to accept this design by means of a simple refitting set, without having to dismantle the pressure regulator from the appliance.

BRIEF DESCRIPTION OF THE DRAWINGS

The objects and features of the present invention, which are believed to be novel, are set forth with particularity in the claims. The present invention, both as to its organization and manner of operation, together with further objects and advantages, may be best understood by reference to the following description, taken in connection with the accompanying drawings, in which:

DETAILED DESCRIPTION

Figure 1:
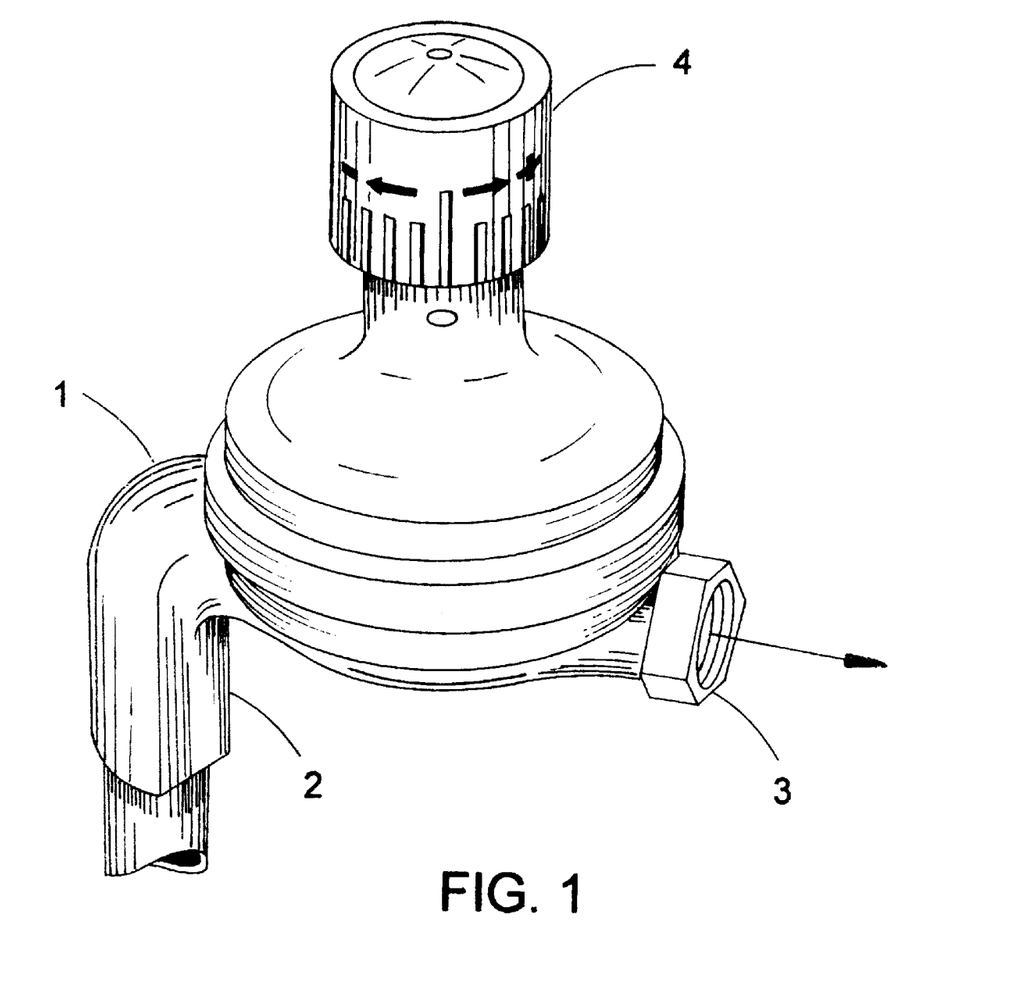
FIG. 1 shows a perspective view of an adjustable pressure regulator showing an inlet and an outlet, and the fine adjustment device.

With reference to FIG. 1, a typical pressure regulator (1) used for barbeque grills, has been fitted with a refitting set that is capable of adjusting the gas flow pressure of a flammable gas that flows from a gas source through a pressure regulator inlet (2), through the regulator and exits out of the pressure regulator outlet (3). The fine adjustment device has a regulator knob (4) having a measuring scale (26) imprinted on an exterior surface (4a) of said regulator knob (4) that allows for precise adjustment of the gas flow pressure.

Figure 2:
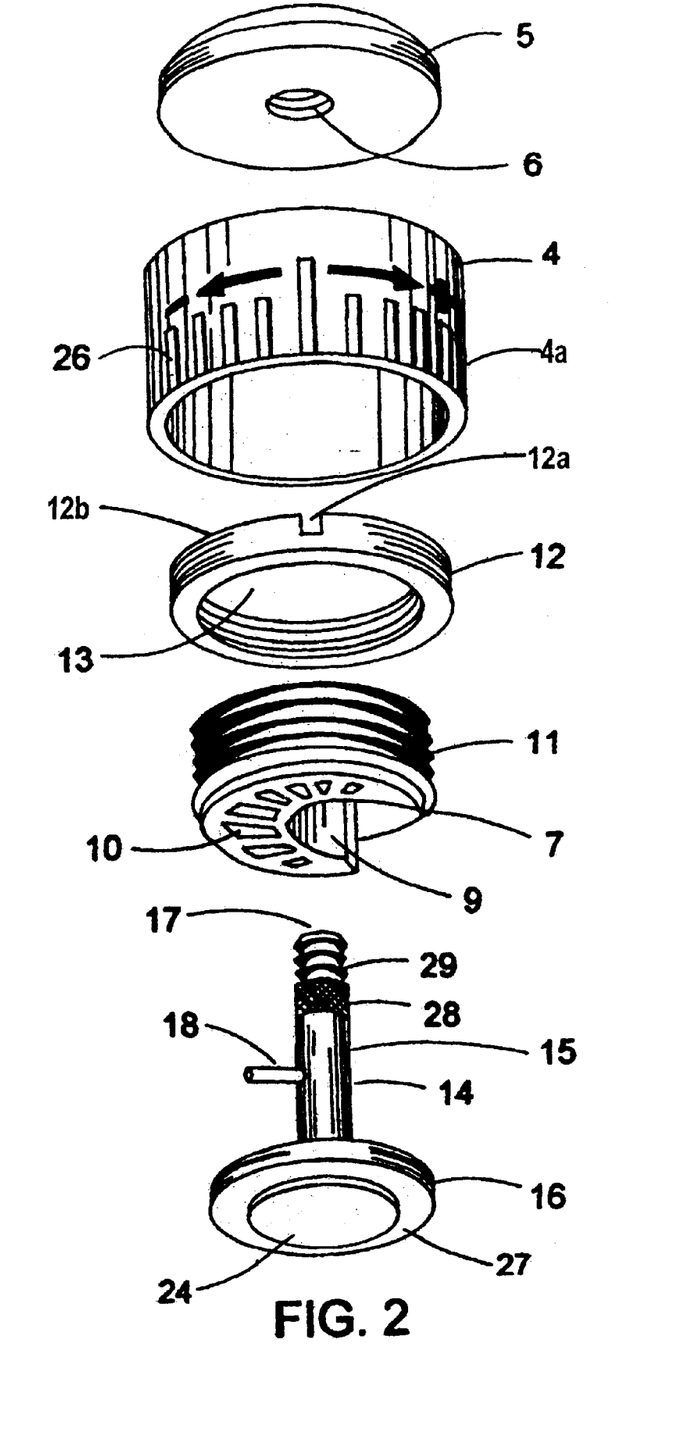
FIG. 2 shows an expanded view of the adjustment means showing the individual components of the fine adjustment device.
Figure 3:
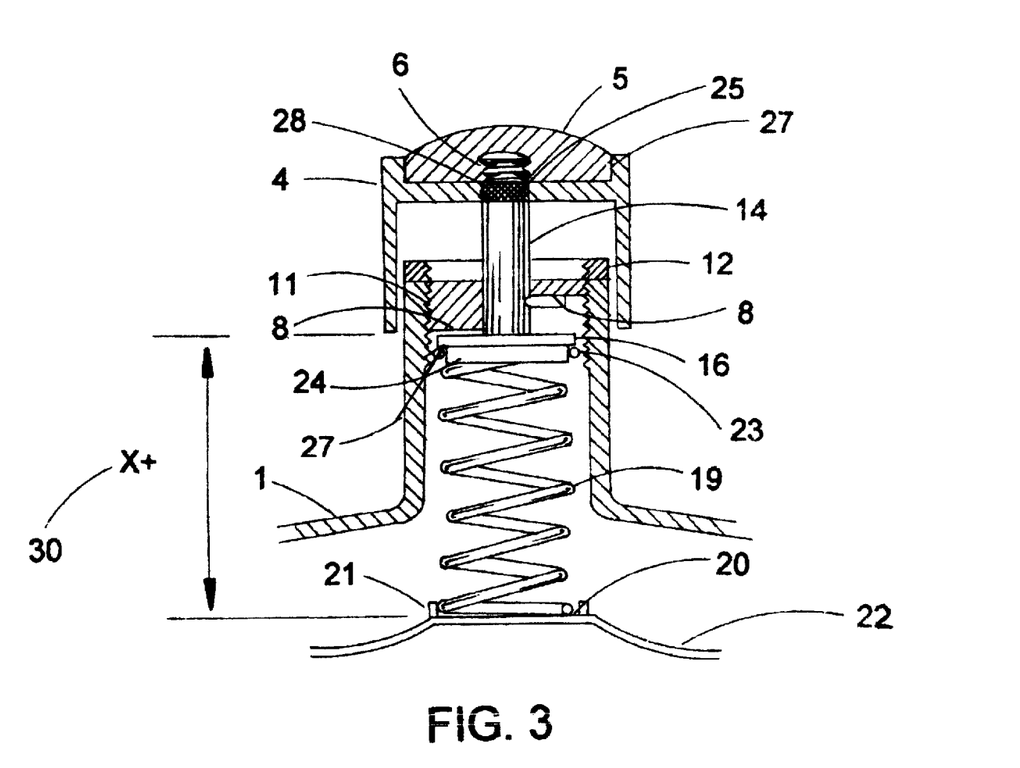
FIG. 3 shows a cross sectional view of the fine adjustment device showing maximum extension of the biasing means, allowing lesser pressure on the regulating diaphragm.
Figure 4:
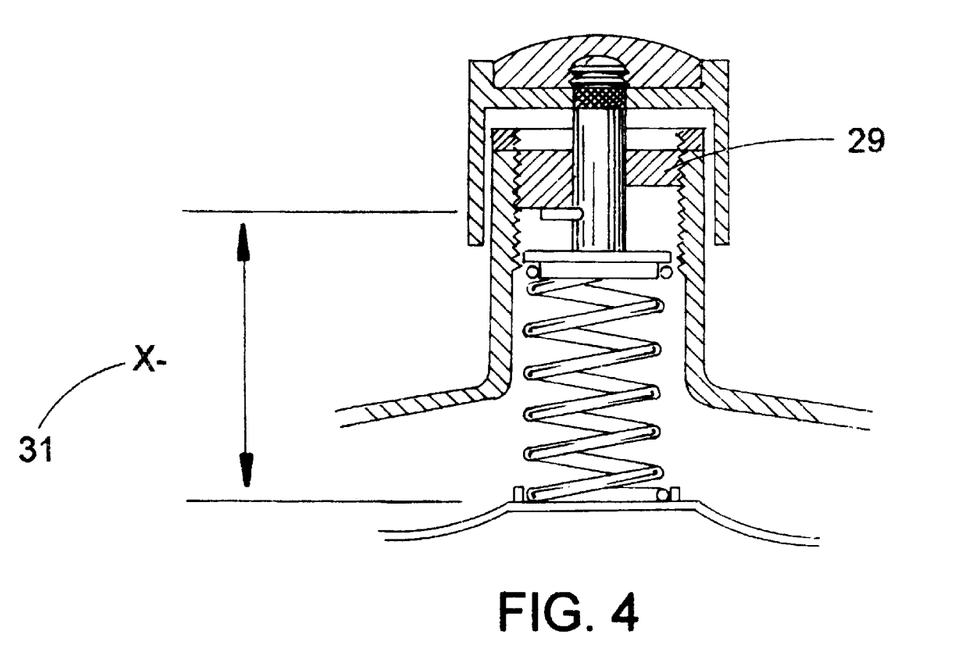
FIG. 4 shows a cross sectional view of the fine adjustment device showing maximum compression of the biasing means, creating greater pressure on the regulating diaphragm.

With reference to FIG. 2 through FIG. 4, a lock nut (5), fits into a recess (27) in the top of the regulator knob (4). The lock nut (5) has a centrally located threaded hole (6). A regulating curve (7) has a lower surface (8), and a centrally located hole (9). The lower surface (8) of the regulating curve (7) has concave detents (10), where the concave detents (10) are radially spaced around the centrally located hole (9). The regulating curve (7) has a threaded exterior surface (11) that is capable of being threadably inserted into the pressure regulator (1). A round nut (12) having means (12a) on a top surface (12b) of said round nut (12) for a tool to rotate said round nut (12), said round nut (12) has a centrally located hole (13) that is capable of threadably receiving the threaded exterior surface (11) of the regulating curve (7). The round nut (12) additionally bears against the pressure regulator (1) preventing undesired motion of the regulating curve (7). The regulating element (14) has a shaft (15). The shaft (15) has a first end connected to a base plate (16) and a second end (17), the second end having a knurled surface (28). The knurled surface (28) of the shaft (15) is press fit into a hole (25) in the top of the regulating knob (4). The second end (17) of the shaft (15) additionally has external threads (29) capable of threadably connecting to the centrally located threaded hole (6) in the lock nut (5). The shaft (15) of the regulating element (14), has an indexing pin (18), the indexing pin (18) projecting perpendicular from the longitudinal axis of the shaft (15) of the regulating element (14). The shaft (15) of the regulating element (14) penetrates through the centrally located hole (9) of the regulating curve (7). The indexing pin (18) bears against the lower surface (8) of the regulating curve (7). The lower surface (8) of the regulating curve (7) has concave detents (10) that provide positive stops for the indexing pin (18) located on the shaft (15) of the regulating element (14).

The baseplate (16) located on the first end of the shaft (15) has a centering boss (24) projecting downwards creating a spring bearing surface (27) on the bottom of the baseplate (16). A spring (19) has an upper end (23) which bears against the spring bearing surface (27), and is centrally positioned on the baseplate (16) by the centering boss (24). The spring (19) has a lower end (20) which is positioned on a lower spring support (21), the lower spring support (21) being attached to a membrane (22) which is located inside the pressure regulator (1).

FIG. 3 shows the indexing pin (18) at its highest position on the regulating curve (7), which corresponds to the greatest extension distance (30) from the baseplate (16) on the shaft (15) of the regulating element (14) to the membrane (22). This yields the least amount of compression force from the spring (19) to the membrane (22).

FIG. 4 shows the indexing pin (18) at its lowest position on the regulating curve (7), which corresponds to the shortest extension distance (31) from the baseplate (16) on the shaft (15) of the regulating element (14) to the membrane (22). This yields the greatest amount of compression force from the spring (19) to the membrane (22).

Figure 5:
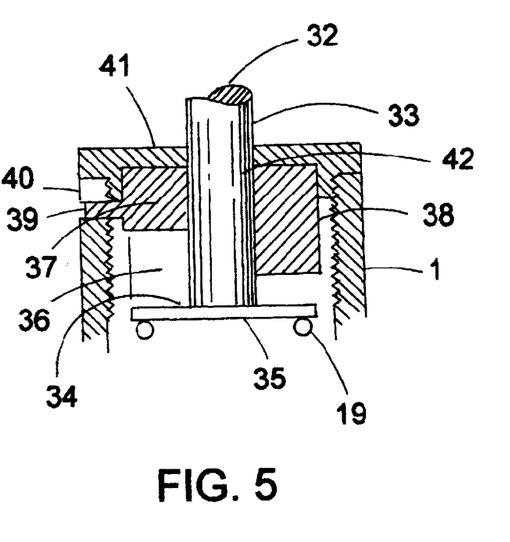
FIG. 5 shows a cross section showing an alternative regulating means assembly.

With reference to FIG. 5, a second embodiment of a fine adjustment device showing a regulating element (32) that has a shaft (33) having a lower surface (34), wherein the lower surface (34) of the shaft (33) has a baseplate (35). The baseplate bears against a spring (19) of the pressure regulator (1). The regulating element (32) has an indexing cam (36) which bears against a lower surface (37) of the regulating curve (38). The regulating curve (38) has a locating pad (39), which is positioned inside a recess (40) formed in the pressure regulator (1). A threaded cap (41) having a central hole (42) to allow the shaft (33) of the regulating element (32) to penetrate therethrough, is threadably attached to the pressure regulator (1) capturing the locating pad (39) of the regulating curve (38) in the recess (40) of the pressure regulator (1) preventing unwanted dislocation of the regulating curve (38) when the regulating element is adjusted.

Figure 6:
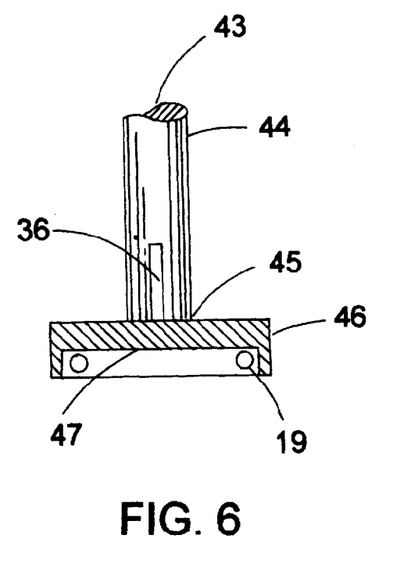
FIG. 6 shows a regulating element that has a means to center a biasing means.

With reference to FIG. 6, a third embodiment of a regulating element (43) having a shaft (44), the shaft (44) having a lower surface (45), the lower surface (45) of the shaft (44) having a baseplate (46) attached thereto. The baseplate (46) having a lower surface (47), the lower surface (47), of the baseplate (46) having a recess (48) defined therein to positionally locate a spring (19) located within a pressure regulator (1).

Figure 7:
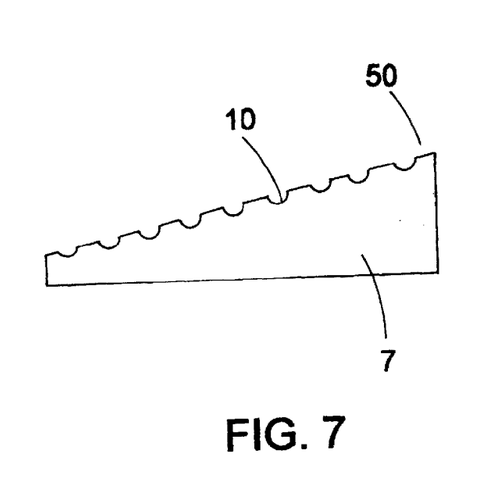
FIG. 7 shows a regulating curve with a guide way running on a smooth incline and concave detents for an indexing pin.

With reference to FIG. 7 the regulating curve (7) is shown with a inclined surface (50), the inclined surface (50) having concave detents (10) formed therein. The concave detents (10) being defined as a series of hollows to positionally locate an indexing pin (18) or indexing cam (36) therein.

Figure 8:
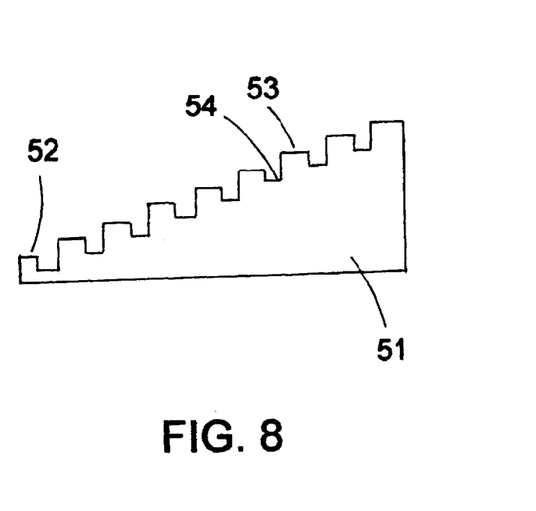
FIG. 8 shows a regulating curve with a guide way rising in steps, with angular detent steps.

With reference to FIG. 8, a second embodiment of a regulating curve (51) having an inclined surface (52), with the inclined surface (52) being a series of steps (53). The inclined surface (52) has concave detents (54) defined therein. The concave detents (54) are a series of steps to positionally locate an indexing pin (18) or indexing cam (36).

Figure 9:
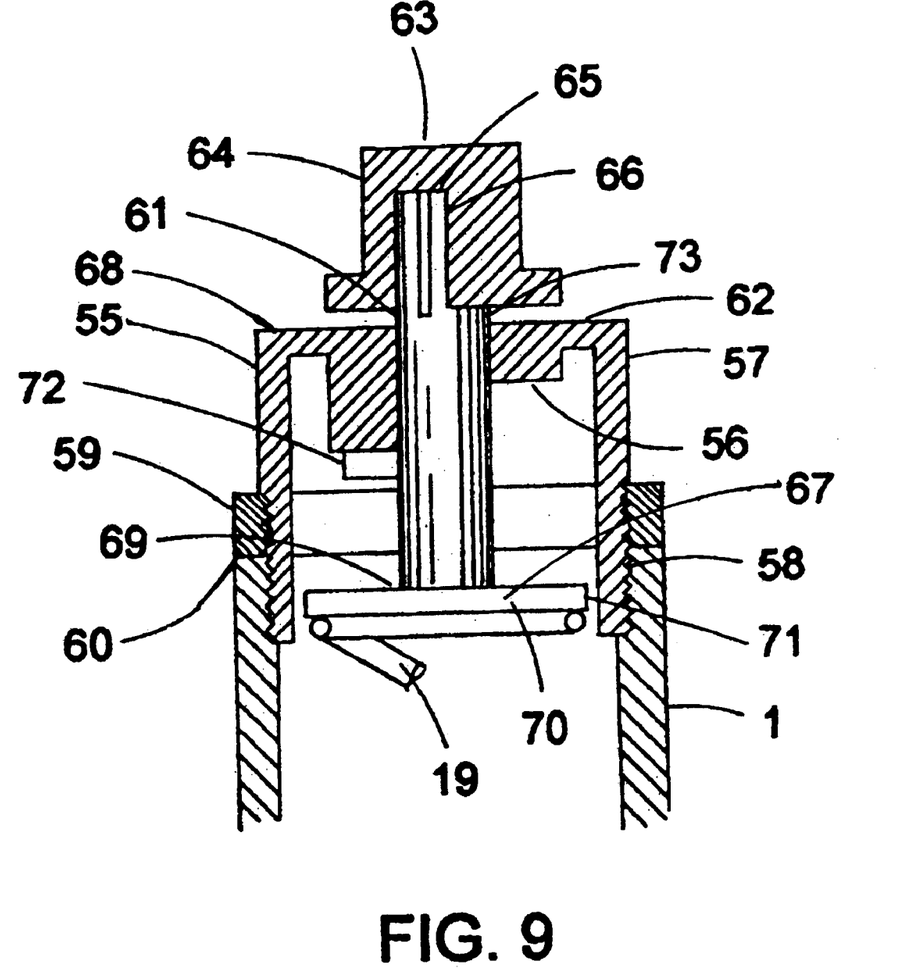
FIG. 9 shows an alternative embodiment of the fine regulating device.

With reference to FIG. 9, showing a third embodiment of a fine adjustment device for gas pressure regulators with a regulating element (67), having a shaft (68), the shaft (68) of the regulating element (67) has a lower surface (69). The lower surface (69) of the regulating element (67) has a baseplate (70) attached to it to provide a bearing surface (71) for a spring (19) used in a pressure regulator (1). A regulating curve (55) has an outer housing (57). A lower surface (56), located inside the outer housing (57) of the regulating curve (55) provides a bearing surface for an indexing pin (72). The indexing pin (72) is located on the shaft (68) of the regulating element (67). The outer housing (57) of the regulating curve (55) has a centrally positioned hole (73) to allow the shaft (68) of the regulating element (67) to penetrate therethrough.

The outer housing (57) of the regulating curve (55) has a lower surface (58) which is externally threaded, allowing it to be threadably inserted into the pressure regulator (1). A locking collar (59) is threadably attached to the external threading of the regulating curve (55). When the regulating curve (55) is positioned in the pressure regulator (1), the locking collar (59) bears against the top surface (60) of the pressure regulator (1), and provides a positive locking feature to precisely locate the regulating curve (55). The regulating curve (55) has a top surface (61) wherein a first graded scale (62) is located.

The shaft (68) has a D shaped boss (66) on its top surface. An regulating knob (63) has a D shaped recess (65) which is press fit onto the D shaped boss (66) located on the shaft (68) of the regulating element (67). A second graded scale (64) is located on the regulating knob (63) to positively identify a zero position of the regulating element (67) when positioned onto the shaft (68). The spring (19) provides force, which causes the indexing pin (72) to bear against the lower surface (56) of the regulating curve (55). The lower surface (56) of the regulating curve (55) has detents as shown in FIG. 7 and FIG. 8.

What is claimed is:

1. A regulating element, said regulating element having a shaft, said shaft having a base plate attached to a bottom end of said shaft, a top end of said shaft, said top end having a regulating knob means, said regulating knob means consists of said top end having an externally threaded portion and a knurled portion located below said externally threaded portion, an indexing means, said indexing means being positioned perpendicular to a longitudinal axis of said shaft and extending outwards from said shaft;

said regulating knob means further consists of a regulating knob having a first central hole, a horizontal plate, said horizontal plate bifurcating said first central hole creating a lower cavity and an upper recess, said horizontal plate having a second central hole connecting said lower cavity with said upper recess, said second central hole providing a tight frictional fit when said shaft of said regulating element penetrates therethrough allowing said externally threaded portion of said shaft to project beyond said horizontal plate, a measuring scale, said measuring scale being imprinted on an exterior surface of said regulating knob;

a regulating curve, said regulating curve having a means for allowing said shaft of said regulating element to pass therethrough, said means for allowing said shaft to said regulating element to pass therethrough consists of a regulating curve with an externally threaded device, said regulating curve having a hole defined therein, said hole being centrally located to a longitudinal axis of said regulating curve allowing said shaft of said regulating element to pass therethrough;

a lower surface of said regulating curve, said lower surface being spirally inclined providing an increasing downward slope, said lower surface additionally having means for positionally locating said indexing means in a fixed location when said indexing means is biased onto said lower surface of said regulating curve, said lower surface of said regulating curve further having a locating means, said locating means being a round nut, said round nut bearing against a pressure regulator housing and preventing any undesired motion of said regulating curve;

means to prevent said regulating curve from being positionally dislocated in said pressure regulator housing; said means to prevent said regulating curve from being positionally dislocated in said pressure regulator housing consists of said round nut, said round nut being internally threaded with an upper surface and a lower surface, said round nut being threadably attached to said externally threaded surface of said regulating curve, said externally threaded surface of said regulating curve being threadably attached to said pressure regulator housing, said lower surface of said round nut bearing against a top surface of said regulator housing preventing said regulating curve from being positionally dislocated, said top surface of said round nut having means for a tool to rotate said round nut on said regulating curve; and said regulating knob means being attached to said shaft of said regulating element, a lock nut, said lock nut having a central internally threaded hole, said internally threaded hole threadably attached to said externally threaded top end of said shaft of said regulating element positionally locking said regulating element in a specified position in relation to said regulating curve and fitting within said upper recess, whereby when said regulating knob is rotated, said indexing means slides along said lower surface of said baseplate of said regulating element increasing compression on a biasing means bearing on a diaphragm located with said pressure regulator housing increasing or decreasing a flow of flammable gas through said regulator housing.

2. An adjustable regulator means for gas pressure regulators as in claim 1 wherein said indexing means is an indexing pin.

3. An adjustable regulator means for gas pressure regulators as in claim 1 wherein said indexing means is an indexing cam.

4. An adjustable regulator means for gas pressure regulators as in claim 1 wherein said baseplate of said regulating element has a lower surface, said lower surface having a cylindrical projection, said cylindrical projection having a diameter less than a diameter of said baseplate for positioning said spring on said lower surface of said regulating element, and providing a ledge for said biasing means to bear against.

5. An adjustable regulator means for gas pressure regulators as in claim 1 wherein said means for positionally locating said indexing means is a series of steps, each step providing a locating recess for said indexing means creating positive stops for said indexing means when said indexing means is biased against said lower surface.

* * * * *